United States Patent Office 3,504,511
Patented Apr. 7, 1970

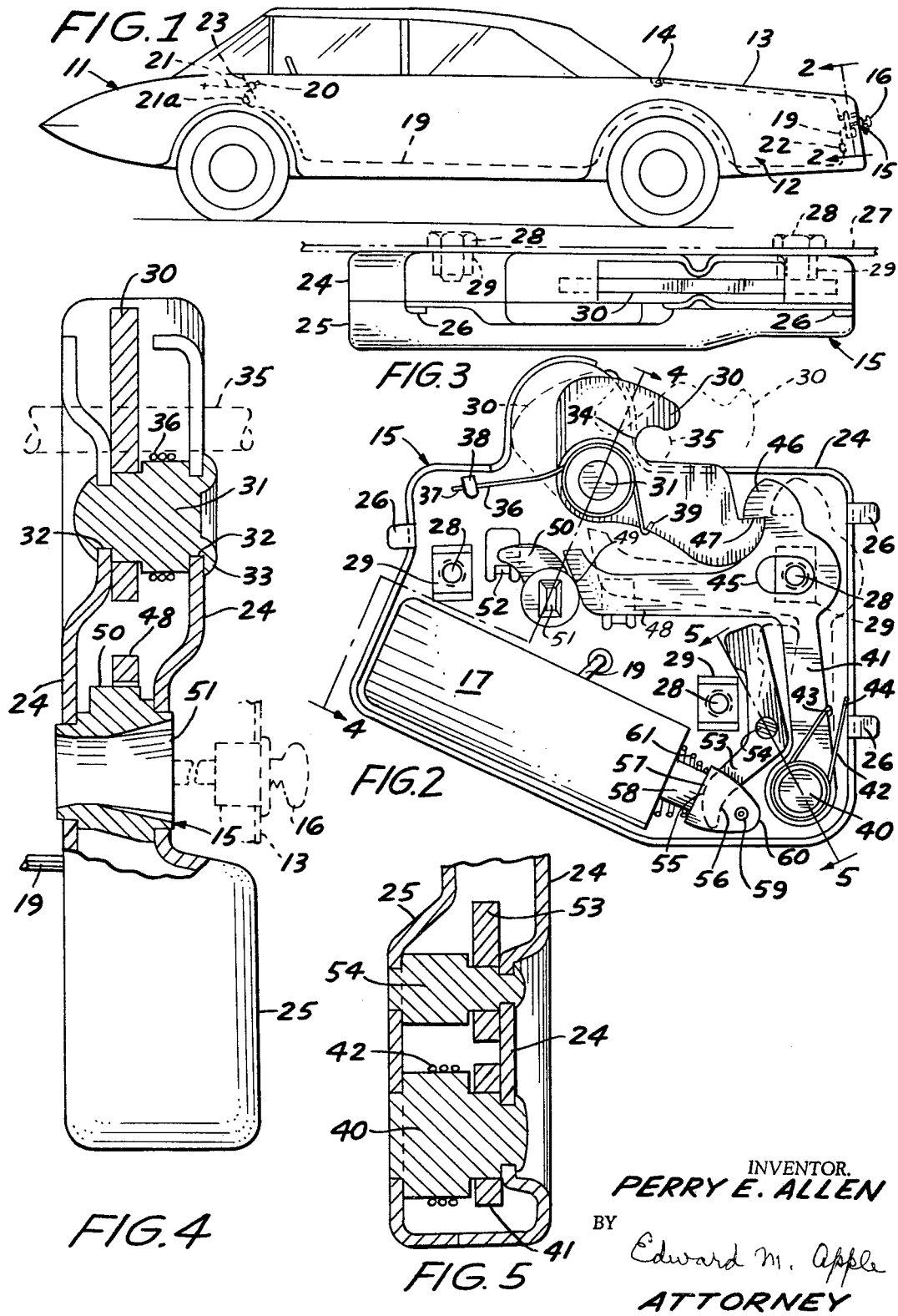

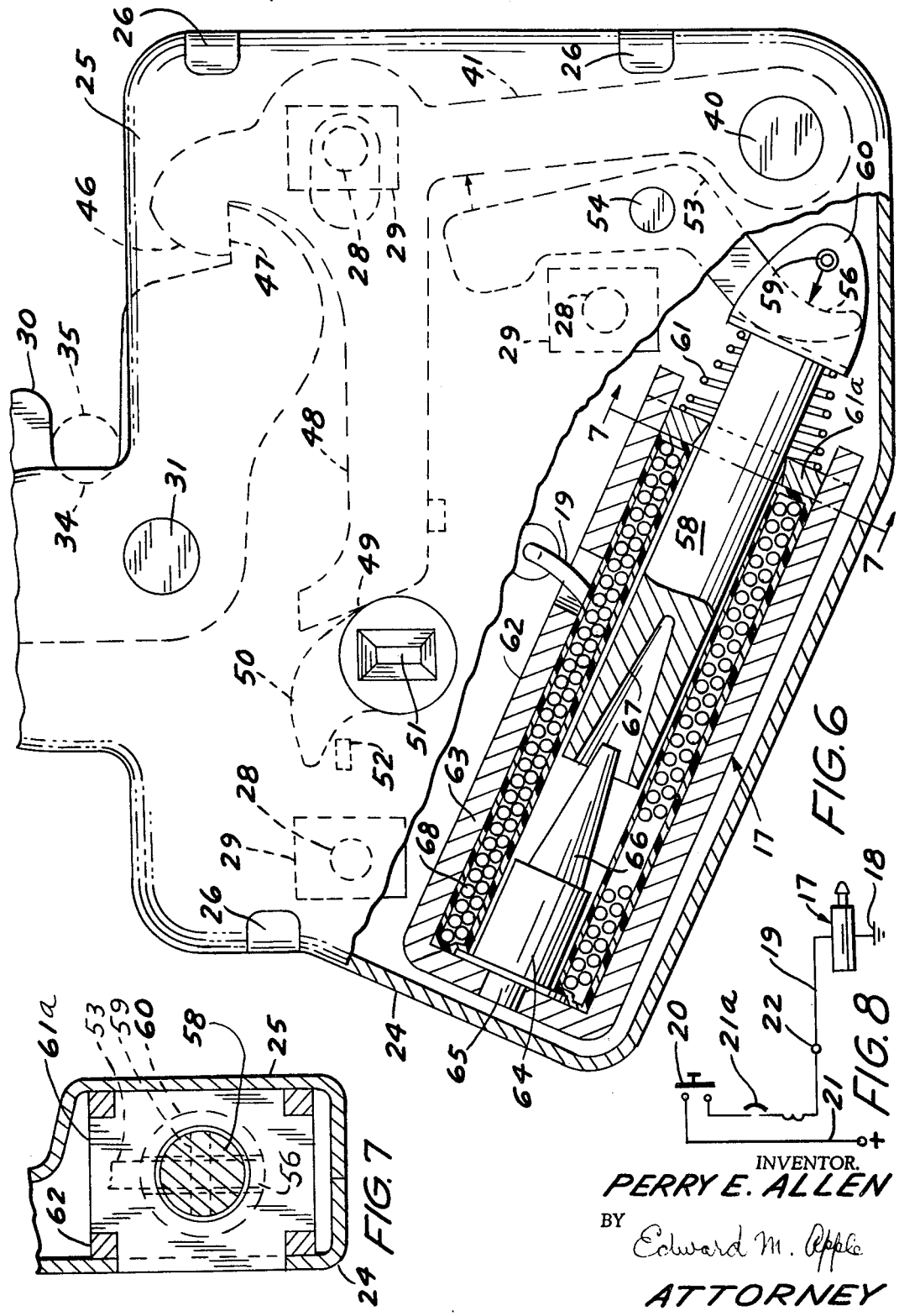

3,504,511
ELECTRIC LOCK RELEASE
Perry E. Allen, 4644 Round Hill Road,
Birmingham, Mich. 48010
Filed Mar. 4, 1968, Ser. No. 710,136
Int. Cl. E05b 65/19; E05c 3/06, 3/16
U.S. Cl. 70—241                                    8 Claims

ABSTRACT OF THE DISCLOSURE

The application discloses a trunk lock and a remotely controlled, electrically operated, lock release mechanism for an automobile. The invention resides in the particular construction and arrangement of the elements, which enables the entire assembly, except the control harness, to be self-contained and to be mounted within the limitations specified by the automobile manufacturer, for manually operated locks of the same kind.

---

This invention relates to locks for automobiles, and has particular reference to a lock for the trunk of a vehicle and means to release the lock electrically, although it also may be used to lock and release other parts of the vehicle, such as the hood, doors, etc.

An object of the invention is to generally improve devices of the character indicated and to provide a novel lock and a remote controlled lock release mechanism, which is simple in construction, economical to manufacture and efficient in operation.

Another object of the invention is to provide a lock and lock release mechanism which is self-contained, except for the control harness, in greatly confined space, which makes it adaptable for use as original equipment on new automobiles, or as a replacement item for old vehicles.

Another object of the invention is the provision of a device of the character indicated which is constructed with an integrated, improved solenoid and linkage, which gives the release mechanism a maximum torque.

Another object of the invention is the provision of a remote controlled lock release mechanism which is constructed and arranged so that dampness caused by condensation and the like cannot affect its operation.

Another object of the invention is to provide a trunk lock and release assembly which may be installed on a new or used automobile at a great saving in cost of labor and materials over any device now known to the public.

Another object of the invention is to provide a trunk lock and release mechanism which may be manually operated by a key or by remote control under all extremes of pressure exerted on the trunk lid because of body misalignment, variations in production tolerances, the durometer of the rubber seal due to temperature extremes and the like.

Automobile trunk locks now known to the public present various problems, first, because of limited space the mechanism is unable to develop sufficient torque to actuate the release elements either manually, or with power, under extreme temperature and pressure conditions as indicated above, secondly, the automatic release mechanisms now employed use the vacuum developed by the running of the engine as the power source. This gives rise to many functional problems due to variations in engine speed, condensation and freezing in the vacuum lines and vacuum cylinder and loss of vacuum due to breaks in the line, etc.

It is, therefore, an object of the invention to obviate the foregoing difficulties and to provide a locking and release mechanism which will function under all conditions. The instant invention being particularly advantageous in the event of freezing of the lock, as the lock may be unfrozen quickly by allowing electric energy to flow through the solenoid for a longer time than it normally takes to operate the plunger of the solenoid, thereby heating up the assembly sufficiently to overcome the freezing.

The foregoing and other objects and advantages of the invention will become more apparent as the description proceeds, reference being made from time to time to the accompanying drawing, forming part of the within disclosure, in which drawing:

FIG. 1 is a side elevational view of a motor vehicle having a rear end trunk and mechanism for locking and unlocking the trunk lid and embodying the invention.

FIG. 2 is an enlarged plan view of the lock assembly with the cover removed.

FIG. 3 is a top elevational view of the device shown in FIG. 2.

FIG. 4 is an enlarged section, with parts broken away, taken substantially on the line 4—4 of FIG. 2. This view shows in dotted lines the manner in which the lock may be operated manually with a key.

FIG. 5 is a fragmentary section taken substantially on the line 5—5 of FIG. 2.

FIG. 6 is an enlarged elevational view of the lock with a portion of the housing broken away, and the solenoid shown in section.

FIG. 7 is a section taken on the line 7—7 of FIG. 6.

FIG. 8 is a schematic view of the electrical circuit employed in the device.

Referring now more particularly to the drawing, it will be understood that in the embodiment herein disclosed, the reference character 11 indicates, in general, a motor vehicle, having a rear trunk 12, which has a lid 13, which is hinged as at 14, and is provided with the lock 15 embodying the invention.

The lock 15 is constructed and arranged so that it may be manually unlocked by means of a conventional key 16, or may be remotely unlocked by means of the electrical elements hereinafter described.

The electrical elements include a solenoid 17, which is enclosed within the housing of the lock 15.

The solenoid 17 is grounded, as at 18 (FIG. 8) to the lock housing in any suitable manner, and is provided with a wire 19, which is connected through a switch 20 to a hot line 21 of the automotive electrical circuit. Interposed between the solenoid 17 and the switch 20 (FIG. 8) is an overload circuit breaker 21A, and a connector plug 22, so that the solenoid may be quickly connected to the electrical circuit of the automobile through the harness illustrated in FIG. 8.

The switch 20 is preferably mounted on the instrument panel 23, of the motor vehicle, within easy reach of the driver of the vehicle, so that the lock may be released by remote control by the driver of the vehicle, as hereinafter described.

The mechanism of the lock 15 is enclosed in a housing, consisting of two stampings 24 and 25, which are of the general shape and configuration as shown in FIGS. 2 and 6, and are secured together by means of a multiplicity of clinch tabs 26, as in conventional practice.

The lock 15 is mounted to an element 27 (FIG. 3), comprising part of the vehicle body, by means of machine bolts 28 (FIGS. 2, 3, and 6), which threadedly engage nuts 29, which are secured to the inside of the stamping 24, by clinch on process, welding, or other suitable means.

A striker cam 30 (FIGS. 2, 4, and 6) is mounted for pivotable action on a rivet 31, which extends through suitable openings 32 (FIG. 4) formed in the stampings 24 and 25.

The rivet 31 is clinched over the edge of the opening 32 in the stamping 24, as at 33 (FIG. 4).

The striker cam 30 is provided with a recess 34 (FIGS.

2 and 6), which is arranged to receive the striker bolt 35, which is permanently mounted in conventional manner on the trunk lid 13, so that the trunk lid 13 is held in closed and locked position, as shown in FIG. 1, when the parts of the lock are in position shown by solid lines in FIG. 2.

The striker cam member 30 is normally urged to open position, as shown by the dotted lines (FIG. 2) by means of a spring 36, which spring is wrapped around the rivet 31, as shown in FIG. 4.

The end 37 of the spring 36 is secured to an element 38 formed on the stamping 24, and the end 39 of the spring 36 is provided with a hook, which engages the lower edge of the striker cam 30, so that the striker cam 30 is tensioned to rotate in an anti-clockwise direction, as shown in FIG. 2.

Mounted for pivotable action, on a rivet 40, is a lever 41 which is under tension by means of the spring 42, one end of which (as at 43) engages the right edge of the lever 41 (FIG. 2), and the other end of which is secured to the stamping 24, as at 44 (FIG. 2), so that the lever 41 is normally urged to the left, as shown by the solid lines (FIG. 2).

The lever 41 is provided with a slot 45, the ends of which serve as limiting means for the travel of the lever 41 when they come in contact with the bolt 28, which is extended therethrough.

The lever 41 is provided at the top with a shoulder portion 46 which is arranged to override a similar shoulder 47 formed on the end of the striker cam 30, as shown in FIGS. 2 and 6. When the lever 41 is in the position shown in FIG. 2, the striker cam 43 will be held in locked position and will overcome the tension in the spring 36.

The lever 41 is provided with an extended arm 48, which terminates in a cam face 49, which is adapted to be contacted by a cam 50, which is arranged to be actuated by the rotation of the key 16, which is insertable into the key slot 51, as in conventional practice.

The key cam 50 is limited in its movement to the left (FIGS. 2 and 6) by means of a stop member 52, which is secured to the inside of the stamping 24, by any suitable means. When the cam 50 is rotated to the right (FIGS. 2 and 6) it rides on the cam face 49 of the arm 48, causing the lever 41 to move to the right to unlock the shoulders 46 and 47, so that the striker cam 30 is free to rotate to the left (FIG. 2), under the influence of the spring 36, as shown by the dotted lines (FIG. 2), thereby releasing the striker bolt 35 to unlock the hinged trunk lid 13. The trunk lid 13 is normally spring biased so that it will fly open upon the release of the lock mechanism.

It will be seen from the foregoing description that I have provided means for manually opening the trunk lid with a key, as in conventional practice. I will now describe the means for releasing the locking mechanism by means of the solenoid 17 and the remote control electrical harness previously described.

The solenoid 17 actuates the lever 41 through a trigger lever 53, which is pivoted on a rivet 54, which is secured to the stampings 24 and 25, as shown in FIG. 5.

The trigger lever 53 has cam surfaces 55 and 56 (FIG. 3) which respectively are arranged to engage a flat face 57 formed on the solenoid plunger 58 and a roll pin 59, which extends through the bifurcated head 60 of the solenoid plunger 58.

The solenoid plunger 58 is normally urged to the right (FIGS. 2 and 6) by means of the compression spring 61, which is positioned between the head 60 of the plunger and the end plate 61A (FIG. 6) of the solenoid frame 62.

In FIG. 6, I show the construction of the solenoid 17, which I employ in this combination, and which makes possible the compact assembly of the lock and release mechanism, and the efficient release of the lock mechanism by remote control.

In general, the solenoid 17 consists of a substantially U-shaped frame 63, which is secured by any suitable means to the stamping 24. The frame 63 and the stampings 24 and 25 provide superior means for the magnetic flux of the solenoid.

The core 64 of the solenoid is secured, as at 65, to the frame 63 and is provided with a truncated cone like extension 66, which is received in a conical cut out 67 formed in the end of the plunger 58. This arrangement provides increasing torque as the plunger 58 moves toward the core 64.

The solenoid is provided with conventional windings 68, which are connected to the electrical harness 19, as shown in FIG. 8.

When the solenoid 17 is energized, the plunger 58 will move to the left (FIG. 6), overcoming the compression of the spring 61.

It will be noted that at the instant the solenoid is energized there is a considerable clearance between the roll pin 59 and the cam face 56, formed on the end of the trigger lever 53, and because of the weight of the end 60 of the plunger I have a highly accelerated mass in motion before the roll pin 59 of the plunger is engaged by the trigger lever 53. This effects a hammer like action on the lower end of the trigger lever 53.

It will be noted that the upper end of the trigger lever 53 is also spaced from the lever 41 when the solenoid is at rest, so that I get a second hammer action between the levers 53 and 41 upon the energization of the solenoid.

This is an important feature of the invention, which coupled with the fact that there is a four to one ratio in the leverage action of the member 41.

It will be understood that I can develop a terrific torque in the lever 41, so that I can remotely release the locking striker cam 30 against any counter pressure that may develop in the trunk lid.

After the striker cam 30 is released from the striker bolt 35 and the lid is unlocked it may readily be relocked by the simple expedient of vigorously lowering the lid 13, so that the striker bolt 35 strikes the striker cam 30 to return it to a locking position, as shown in FIGS. 2 and 6.

It is believed that the operation of the device is obvious from the foregoing description.

Having described my invention, what I claim and desire to secure by Letters Patent is:

1. The combination with a motor vehicle having a hinged member, of a housing secured to the body of said vehicle, a locking mechanism within said housing, including a latch element extending to the exterior of said housing and cooperating with an element on said hinged member to lock said hinged element in closed position, a solenoid encased in and grounded to said latch housing, said solenoid being electrically connected to the electrical system of said vehicle and having a reciprocable plunger with associated means for effecting a double hammer action to trip said locking mechanism when said solenoid is energized.

2. The combination defined in claim 1, in which the said locking mechanism includes a spring biased striker cam pivoted for engagement with an element on said hinged member, a spring biased lever pivoted at its end removed from said striker cam and having a shoulder arranged to override a shoulder on said striker cam to hold said cam in locking position, a trigger arm pivoted intermediate its ends and having one end normally spaced from said lever and having its other end normally spaced from a drive pin carried by the said solenoid plunger, where upon energization of said solenoid said pin will actuate said trigger arm and said trigger arm will actuate said lever to unlock said striker cam.

3. The combination with a motor vehicle having a hinged member, of a housing secured to the body of said vehicle, a locking mechanism within said housing, including a latch element extending to the exterior of said housing and cooperating with an element on said hinged member to lock said hinged element in closed position, a solenoid encased in and grounded to said latch housing, said solenoid being electrically connected to the electrical system of said vehicle and having a reciprocable plunger with associated means for effecting a double hammer action to trip said locking mechanism when said solenoid is energized, the said locking mechanism including a spring biased striker cam pivoted for engagement with an element on said hinged member, a spring biased lever pivoted at its end removed from said striker cam and having a shoulder arranged to override a shoulder on said striker cam to hold said cam in locking position, a trigger arm pivoted intermediate its ends and having one end normally spaced from said lever and having its other end normally spaced from a drive pin carried by the said solenoid plunger, where upon energization of said solenoid said pin will actuate said trigger arm and said trigger arm will actuate said lever to unlock said striker cam, the plunger of said solenoid being arranged to travel a predetermined distance before said pin contacts said trigger arm, and the opposite end of said trigger arm being arranged to travel a predetermined distance before it strikes said lever, whereby the said double hammer action is effected.

4. The structure of claim 3, in which said lever is provided with a lateral extension which terminates in a cam, a key actuated cam pivoted near said first cam and arranged to contact said first cam to move said lever out of locking position with said striker cam.

5. The structure of claim 3, in which said solenoid is provided with an elongated U-shaped frame which is secured to said housing and supports said plunger, said plunger having an enlarged, bi-furcated head which is traversed by a drive pin, the latter being normally spaced from one end of a trigger arm, the other end of which arm is arranged to strike a locking lever comprising part of the locking mechanism.

6. The structure of claim 1, in which said solenoid is provided with an elongated U-shaped frame, which together with said latch housing carries the magnetic flux of said solenoid, said frame supporting a core and plunger of said solenoid, said core having a truncated cone like extension and said plunger having a conical recess for receiving said core extension.

7. The structure of claim 1, in which said plunger is supported in a U-shaped frame having an end closure member with an opening therein for receiving said plunger, an enlarged bifurcated head on said plunger and a spring concentric with said plunger and positioned between said end closure member and said head and arranged to return said plunger to a position of rest after said solenoid has been energized.

8. The structure of claim 1, in which said locking mechanism includes a striker cam arranged for holding in locked condition said hinged member, an elongated lever having at least a four to one ratio and having means thereon for holding said striker cam in locked condition, and a trigger arm actuable by said plunger for kicking said lever out of locking position with said striker cam.

References Cited

UNITED STATES PATENTS

| | | | |
|---|---|---|---|
| 2,757,949 | 8/1956 | Delany | 292—1 |
| 2,896,990 | 7/1959 | Garvey et al. | 292—229 |
| 2,943,880 | 7/1960 | Joachim et al. | 292—201 |
| 3,016,968 | 1/1962 | Lenz et al. | 180—82 |

RICHARD E. MOORE, Primary Examiner

R. L. WOLFE, Assistant Examiner

U.S. Cl. X.R.

70—279; 292—201, 216